Jan. 30, 1968 R. W. LUCKY 3,366,895

APPARATUS FOR OPTIMUN DISTORTION CORRECTION OF A COMMUNICATION CHANNEL HAVING AN INITIAL DISTORTION GREATER THAN 100%

Filed April 14, 1965 2 Sheets-Sheet 1

INVENTOR
R. W. LUCKY
BY J. P. Kearns
ATTORNEY

United States Patent Office 3,366,895
Patented Jan. 30, 1968

3,366,895
APPARATUS FOR OPTIMUM DISTORTION CORRECTION OF A COMMUNICATION CHANNEL HAVING AN INITIAL DISTORTION GREATER THAN 100%

Robert W. Lucky, Red Bank, N.J., assignor to Bell Telephone Laboratories, Incorporated, New York, N.Y., a corporation of New York Filed Apr. 14, 1965, Ser. No. 448,217
9 Claims. (Cl. 333—18)

This invention relates to the correction of the distorting effects of transmission channels of limited frequency bandwidth on data intelligence signals and particularly to the rapid automatic equilization of such channels where the total output distortion exceeds the peak amplitude of the received data signals.

In the copending patent application of F. K. Becker, R. W. Lucky, and E. Port, Ser. No. 396,836 filed Sept. 16, 1964, now Patent No. 3,292,110 the basic principles of an automatic equalization system employing a transversal filter of finite length in a data receiver to minimize overall pulse distortion are disclosed. The minimization of distortion is completed prior to actual data transmission during a period when test pulses are transmitted over the distorting transmission channel. At this time the adjustable multiplier taps on the transversal filter are set to optimum values using an iterative scheme of steepest descent increments. Polarity information only is required from the taps for each test pulse to determine the direction for the incremental adjustments.

The telephone voice channel, to the equalization of which the arrangeemnt disclosed in the copending application is directed, exhibits a degree of distortion which permits binary data transmission without equalization at rates up to about 2400 bits per second. With equalization binary data rates up to 9600 bits per second are attainable when equalization is combined with multilevel encoding. The arrangement disclosed may break down for transmission channels in which the initial distortion is great enough to preclude even binary transmission.

The assumption was tacitly made in the copending application that the aggregate absolute amplitude of the distortion components in the time domain was less than, or at most equal to, the peak amplitude of the impulse response. Such distortion is designated as less than one hundred percent. Distortion in the average telephone channel is well below one hundred percent. However, such levels of distortion may exist in high-frequency radio channels.

Accordingly, it is an object of this invention to equalize optimally the distortion imparted by a transmission channel on a pulse signal even when such distortion exceeds in the aggregate the peak impulse response amplitude.

It is another object of this invention to determine the parameters for, and adjust, the multipliers in a transverse filter for optimum distortion correction of a communication channel having an initial distortion greater than one hundred percent.

It is a further object of this invention to implement an automatic equalization system operable over a range of distortion exceeding the main signal component.

It is a still further object of this invention to extend the range of distortion over which automatic equalization of a data transmission channel on a per-call basis can be effected.

These objects and others are accomplished according to this invention by employing a transversal filter which includes a tapped delay line with additional listening-post taps located beyond the range of taps with adjustable multipliers. The outputs of the multipliers together with the output of the main or reference tap are brought to a common summing terminal. For test purposes an inverter element is provided for each lateral tap including the listening-post taps for multiplication of a distortion component by plus or minus one.

A two-pulse test cycle is applied repeatedly before message transmission to the transmission channel in tandem with the transversal equalizer. The first pulse of each cycle is allowed to pass through the adjustable attenuators of the inner taps over what may be considered the normal range of the equalizer. Successive summed outputs as the pulse traverses the equalizer are sliced to obtain polarity information which is used to establish the polarity of the inverters at all taps including the outermost nonadjustable taps. The second pulse of each cycle is then transmitted through the inverters at all lateral taps with the result that each sample of the test pulse is multiplied by plus or minus unity in accordance with the previous inverter settings. The sums of the products at each sampling time are proportional to the slope of the distortion versus tap gain curve at each tap and are used to increment the attenuator settings accordingly.

Since the total length of the delay line is longer than its variable portion, distortion beyond the range of the variable portion is taken into account in establishing the settings of the variable attenuators. Any distortion that might have been pushed beyond the equalizer range in the single-pulse test cycle of the previously-mentioned copending application is now minimized along with distortion within the variable range.

Each two-pulse cycle reduces the residual distortion by an incremental amount along a curve of steepest descent. The minimum distortion correctible within the range of an equalizer of a given length is reached when the residual distortion is within one-half step of the incremental adjustment provided on the attenuators. This step can be chosen to be less than the noise level on the channel being tested.

It is assumed that the amplitude of the principal signal component at the center or main tap of the transversal equalizer is maintained constant during the test period.

After the test period is completed, the variable attenuators remain in the last established condition while message data is transmitted over the now equalized facility. Neither the outer taps nor the inverters are used during message data transmission.

It is a feature of this invention that a highly distorted transmission channel can be automatically equalized by modifying the apparatus disclosed in the aforementioned copending application to determine separately the inverting and attenuating functions of the adjustable tap multipliers and to double the length of the delay line. Although the delay line is extended in length, attenuators are unnecessary beyond the normal delay line length. The extra length is required only during set-up time.

Another feature of this invention is that the test procedure involves the transmission of a train of identical test pulses as in the aforementioned copending application. However, on every alternate pulse the equalizer is switched from attenuators only in circuit with the delay line taps to inverters only in circuit therewith. Adjustments to the inverters are made on the basis of samples taken when the attenuators are in the circuit and adjustments to the attenuators, when the inverters are in the circuit. Attenuator settings are preserved and used during message transmission, while the inverters are used only during the test period.

Additional objects, advantages and features of this invention will become apparent from a consideration of the following detailed description and the drawing in which.

Figure 1:
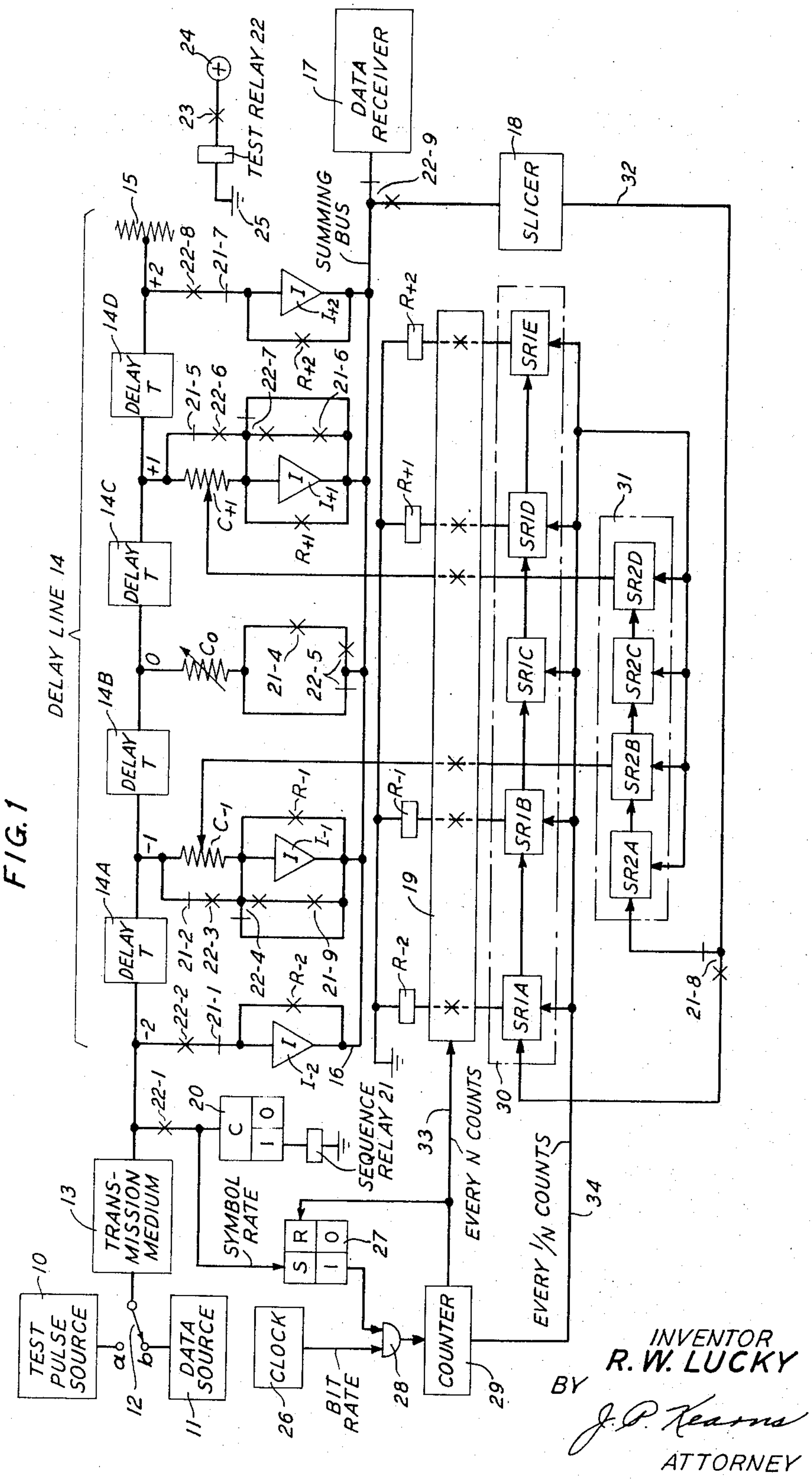
FIG. 1 is a block diagram of an illustrative embodiment of an automatic transversal equalizer with an extended range of distortion correction capability according to this invention.

FIG. 1 shows in detail the extended-range automatic equalizer of this invention which is useful for post-channel equalization of baseband synchronous data transmission facilities. A channel equalized by such an equalizer can readily transmit multilevel signals and thereby raise the equivalent binary transmission speed of a band-limited channel up to four times that attainable in the unequalized channel. With the transversal equalizer adjusted according to the techniques of this invention a channel which will not even transmit error-free binary data when unequalized can support multilevel transmission.

The conventional transversal filter equalizer comprises, as is shown in FIG. 1, a tapped delay line 14, lateral taps spaced by equal increments of delay T along the delay line, a variable multiplier C with an adjustment range between plus and minus one at each tap, and a summing bus 16. The transversal equalizer is essentially an arrangement for multiplying time-spaced samples of an incident signal by variable factors in the range of plus and minus unity and combining the resultant products into a single sum.

The term multiplier is used generically herein to designate a circuit for providing a multiplying factor in the range between plus and minus one. The term encompasses the combination of an inverter and an attenuator. An inverter is restricted to multiplication by minus one. An attenuator is restricted to multiplication by a fractional factor less than one.

A transmission channel which is ideal for pulse transmission at a rate $1/T$ responds to a unit impulse by producing a new pulse dispersed in the time domain to exhibit regular zero-axis crossings at T-second intervals. Only the peak of the response has a nonzero amplitude at a properly chosen sampling instant. As a consequence a series of impulses with spacing T is received without intersymbol interference.

Practical channels exhibit differential delay and attenuation characteristics with respect to frequency. Therefore, the zero-axis crossings in the impulse response do not occur at evenly spaced intervals of time T.

We can let the impulse response of a practical channel be denoted $x(t)$. Its samples at times $n$T will form a time sequence $x_n$, with $n$ assuming both negative and positive integral values. $x_0$ denotes the main central amplitude of the impulse response and is assumed to be normalized at unity. The absolute sum of all the remaining values of $x_n$ is the initial distortion to be corrected by a transversal equalizer.

If the distorted impulse response is applied to a transversal equalizer, the time sequence $x_n$ is multiplied by a tap gain sequence $C_n$ according to the rules of polynominal multiplication. The values $C_n$ are the multiplying factors in the range of plus to minus one provided by the variable multipliers C in the equalizer of FIG. 1.

The result of the multiplication of the time sequence $x_n$ and the tap gain sequence $C_n$ is a new time sequence $h_n$, which has twice as many terms as the input sequence $x_n$. The final distortion is the sum of all the absolute values of $h_n$, except that at the main tap of the delay line. The tap gain sequence $C_n$ is to be established in such a way as to reduce the final distortion to a minimum value. It can only be reduced to a zero value by a transversal equalizer of infinite length. The setting of the center tap multiplier $C_0$ is preferably controlled by an automatic gain control to maintain $h_0$ at unity value.

In the arrangement of the copending application the transversal filter tap gain sequence $C_n$ is determined on the basis of bringing all the $h_n$ values, other than $h_0$, within the range of the equalizer to zero values simultaneously. Values of $h_n$ beyond the equalizer range are uncompensated. At this time distortion is optimally and necessarily minimum considering the length of the available equalizer provided only that the initial distortion ($x_n$ sequence, $x\neq0$) is less than unity. We describe the case where the absolute-value summation $x_n$ ($x_n\neq0$) equals $x_0$ equals unity as one hundred percent distortion. The technique of the copending application guarantees minimum final distortion only when the initial distortion is one hundred percent or less.

According to the present invention a transversal equalizer of finite length can be adjusted automatically and optimally even when the initial distortion exceeds one hundred percent. With the previous technique applied to cases of distortion exceeding one hundred percent the distortion within the range of the delay line was indeed minimized. However, the distortion beyond the range of the delay line could loom larger than the initial distortion.

The situation may be analogized to that of attempting to produce a central bulge in a sausage-shaped balloon by pressing down with the fingers of each hand on each side of the center. When the length of the balloon is comparable to the span of the hands, the bulge can readily be confined to the center; however, when the balloon is much longer, the bulges beyond the hands may be uncontrollably larger than the central bulge.

It can be shown that the derivative of the distortion with respect to an incremental tap gain adjustment is equal to the sum of the products of all the distortion components of the input sequence $x_n$, except $x_0$, and the sign (polarity) of the distortion component $h_n$ of the output sequence. This derivative establishes a gradient directed toward a single minimum distortion value. In the arrangement of the copending application this derivative was taken simply as the sign of the distortion component $h_n$ on the assumption that any individual component of the $x_n$ sequence was negligible with respect to the central component $x_0$. Now this assumption is discarded. With the prior arrangement, a good transmission channel can be equalized into an excellent channel. With the arrangement of the present invention, a bad and unusable channel can at least be made good.

The apparatus of FIG. 1 is arranged first to determine the sign of $h_n$, then to determine the magnitude of the initial distortion component $x_n$, and finally to adjust the multipliers accordingly. Since the $x_n$ sequence is infinite, additional taps beyond the normal range of adjustment are provided as listening posts and their outputs factored into the determination of the $C_n$ corrections. An infinite number of listening posts are fortunately not required in a practical case because only about twice the number of samples of the output response for which adjustment is provided directly are significant.

FIG. 1 illustrates a transversal equalizer with a five-tap delay line 14. Taps are designated −2, −1, 0, +1 and +2. The taps are separated by delay units 14A through 14D, each having a uniform delay time T. Delay line 14 is terminated at the right in its characteristic impedance 15 to prevent reflections. Delay time T is the sampling interval for data transmitted therethrough. The center or main tap designated zero is connected by way of a variable attenuator $C_0$ to summing bus 16. Inner taps −1 and +1 are similarly connected to summing bus 16 through variable multipliers $C_{-1}$ and $C_{+1}$, whose final settings are to be established, and inverters $I_{-1}$ and $I_{+1}$, respectively. This number of taps is shown for illustrative purposes only. Several more pairs of inner taps may be found desirable in a practical case. Outer or listening post taps −2 and +2 located at the extremes of the delay line are connected to summing bus 16 through inverters $I_{-2}$ and $I_{+2}$, respectively. No attenuators are necessary for the outer taps. In a practical case as many outer, nonadjustable taps are provided as there are inner, adjustable taps.

The portion of FIG. 1 so far described constitutes a conventional transversal filter, except for the nonadjustable outer taps and the separate inverters, which are for test purposes only. To operate as an equalizer in a data transmission system the input tap −2 is connected to a transmission medium 13 and a data source 11. Switch 12 at the transmitter is assumed closed to position *b*. Summing bus 16 is connected to data receiver 17. The equalizer connected for message data reception is shown in simplified form in FIG. 4. Only the reference tap 0 and inner taps −1 and +1 are connected through the respective attenuator $C_0$ and multipliers $C_{-1}$ and $C_{+1}$ to summing bus 16 and thence to data receiver 17.

The remainder of FIG. 1 is circuitry required for automatic determination of settings for attenuators $C_{-1}$ and $C_{+1}$. Attenuators $C_{-1}$ and $C_{+1}$ may conveniently be of the step type controlled by reversible counters over the range of plus and minus one as described in detail in the aforementioned copending application. Inverters $I_{-2}$ through $I_{+2}$ are merely unity gain amplifiers provided for test purposes.

Detached-contact representations of contacts controlled by the operating coils of sequence relay 21 and test relay 22 are shown in series and shunt with the several attenuators and inverters. A cross represents a make contact and a perpendicular slash, a break contact according to the well-known detached-contact symbolism.

Figure 4:
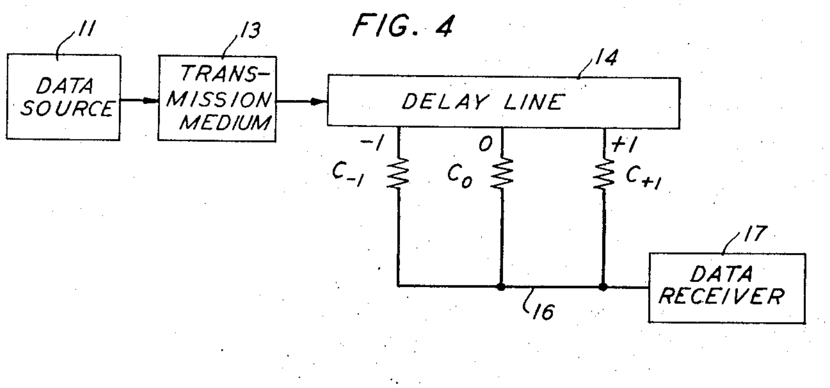
FIG. 4 is a simplified functional block diagram of the automatic equalizer of FIG. 1 in condition for the receipt of message data.

Test relay 22, when in the released condition due to the open state of switch contact 23, places the circuit in the data-run condition as shown in FIG. 4 and as described above. At this time make-contact 22–1 in series with two-step counter 20, make-contacts 22–2 and 22–8 in series with the outer taps −2 and +2, make-contacts 22–3 and 22–6 in shunt of multipliers $C_{-1}$ and $C_{+1}$, make portion of transfer contacts 22–4 and 22–7 in shunt of inverters $I_{-1}$ aid $I_{+1}$, and make portion of transfer contacts 22–5 and 22–9 are all open. The break portions of transfer contacts 22–5 and 22–9 at this time effectively close center tap 0 of delay line 14 to summing bus 16 and summing bus 16 to data receiver 17, respectively. Similarly, the break portions of transfer contacts 22–4 and 22–7 shunt out inverters $I_{-1}$ and $I_{+1}$, respectively.

Test relay 22 is operated by closing switch 23 either manually or as the result of some particular code sequence from the transmitting data source. Current from potential source 24 then flows to ground 25 through the coil of relay 22. All the above-mentioned relay contacts then close, including the make portion of transfer contacts 22–4, 22–5, 22–7 and 22–9.

On the closure of the make portion of contact 22–9 of test relay 22 summing bus 16 is connected to slicer or threshold circuit 18, whose binary output on lead 32 is connectable to either shift register 30 or 31 according to the position of sequence relay 21. Shift register 30 has at least as many stages, such as those designated SR1A, SR1B, SR1D, and SR1E, as there are inverters connected to the taps on delay line 14. Shift register 31 has at least as many stages, such as those designated SR2B and SR2D, as there are variable multipliers connected to inner taps on delay line 14.

Both shift registers are advanced by pulses at the rate $1/T$ from counter 29 over lead 34. Middle stages SR1C and SR2B are dummy stages to maintain timing and to block any samples taken at the time the peak of the received impulse response is at center tap 0 of delay line 14 from affecting the inverters or attenuators. Stage SR2A is also a dummy stage to insure that the proper samples control the multipliers. Without the dummy stages certain advance pulses of each cycle would have to be blocked. Provision for such pulse blocking would unnecessarily complicate the circuitry.

Counter 29 is controlled by clock 26, which in turn is synchronized at the message bit rate in some suitable fashion with the transmitter clock (not shown). Counter 29 is enabled through coincidence gate 28 whenever a test pulse is incident on delay line 14. Counter 29 is arranged to have an output on lead 34 at the bit rate in synchronism with clock 26 and a further output on lead 33 after a predetermined number of counts N determined by the length of delay line 14. Counter 29 is controlled through flip-flop 27 to cut itself off after the predetermined number of counts N. Flip-flop 27 is set by a test pulse at the end of transmission medium 13 to enable AND-gate 28. It is reset by counter 29 at the end of the predetermined number of counts.

Gate circuit 19 connects the outputs of shift register 30 to relays $R_{-2}$ through $R_{+2}$, whose similarly numbered make-contacts control the status of the inverters in series with the delay line taps. The gate is enabled at the end of the predetermined number of counts on lead 33. Gate circuit 19 also connects shift register 31 to multipliers $C_{-1}$ and $C_{+1}$ at the appropriate time.

Sequence relay 21 is controlled by flip-flop 20 which makes two counts in synchronism with test pulses at the input of the delay line in a well-known manner. Relay 21 is driven by the "1" output of flip-flop 20.

In operation test relay 22 is first actuated at the beginning of a data call, for example. Transmission medium 13 may advantageously be a switched or private line telephone connection which would necessarily have different transmission characteristics for each call. At this time switch 12 is thrown to position *a* to place test pulse source 10 in circuit with transmission medium 13. Test pulses are transmitted at some multiple of the data bit rate so that no impulse response samples overlap on delay line 14. On the first pulse flip-flops 20 and 27 change to the "1" state. Flip-flop 20 actuates sequence relay 21, and flip-flop 27 starts counter 29.

The operation of sequence relay 21 removes inverters $I_{-2}$ and $I_{+2}$ from the circuit through break-contacts 21–1 and 21–7, opens the shunt paths around multipliers $C_{-1}$ and $C_{+1}$ through break-contacts 21–2 and 21–5, shunts out inverters $I_{-1}$ and $I_{+1}$ through contacts 21–9 and 21–6, closes a path for attenuator $C_0$ through make-contact 21–4, and connects slicer 18 to shift register 30 through the make portion of contact 21–8.

Figure 2:
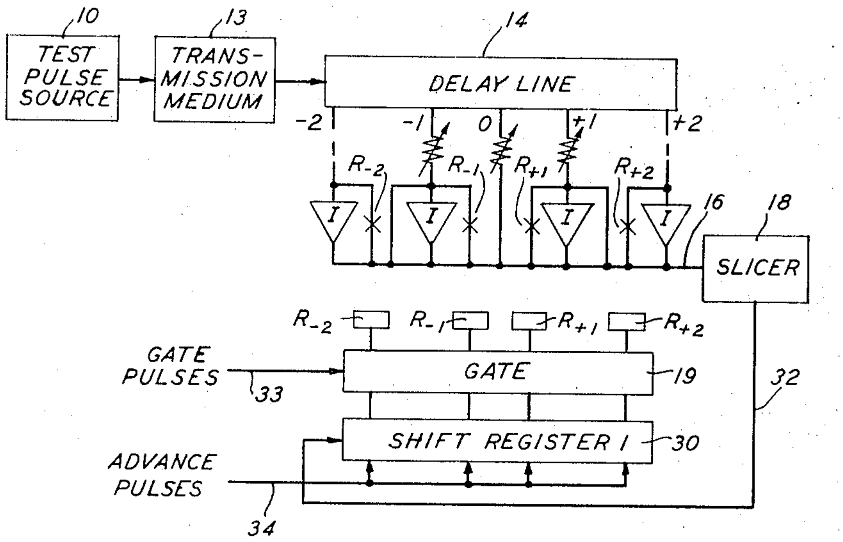
FIG. 2 is a simplified functional block diagram of the automatic equalizer of FIG. 1 in condition for determination of inverter settings on one of the alternate test pulses.

The test circuit is now in the configuration shown in FIG. 2. This configuration is substantially that prevailing in the test circuit of the aforementioned copending application except for the direction in which polarity samples are entered in the storage register. Only the inner adjustable and the center tap are in circuit with summing bus 16. As the test pulse progresses through delay line 14 the principal sample at each time-spaced interval is obtained through the center tap where the multiplication factor is maintained at plus one. Effectively therefore the individual distortion components of input sequence $x_n$ appear on summing bus 16. These components are sliced for polarity determination and polarity indicators are stored binary fashion in the several stages of shift register 30. The first sample indicative of the polarity of the earliest arriving distortion component ends up on stage SR1E on the right when counter 29 stops. Succeeding samples are stored in shift-register stages to the left. After the predetermined number of counts N, gate 19 is enabled and the contents of shift register 30 are applied to relays $R_{-2}$ through $R_{+2}$, thereby settling the inverters in position from left to right to compensate for distortion running from the last arriving to the earliest arriving component. The connections to the relay are such that a negative polarity indication will operate the appropriate relay and a positive indication will not. Holding paths (not shown) are assumed to be provided in a convenient manner.

These relays control similarly numbered contacts in shunt with the several inverters. A positive polarity indication removes the shunt so that the next sample through the associated tap will be inverted.

The next test pulse through transmission medium 13 advances flip-flop 20 one count and releases sequence relay 21. Inverters $I_{-2}$ through $I_{+2}$ are now provisionally (depending on the status of relays $R_{-2}$ through $R_{+2}$ as just set) in circuit with summing bus 16 through break-contacts 21–1 and 21–7 to provide gain factors of plus or minus one. Shunts around in inverters $I_{-1}$ and $I_{+1}$ are removed by opening of contacts 21–9 and 21–6. Multipliers $C_{-1}$ and $C_{+1}$ are shunted out of the circuit by the closing of contacts 21–2 and 21–5. The path to summing bus 16 from center tap 0 is opened through contact 22–5. Shift register 31 is connected to the output of slicer 18 through the break portion of contact 21–8.

Figure 3:
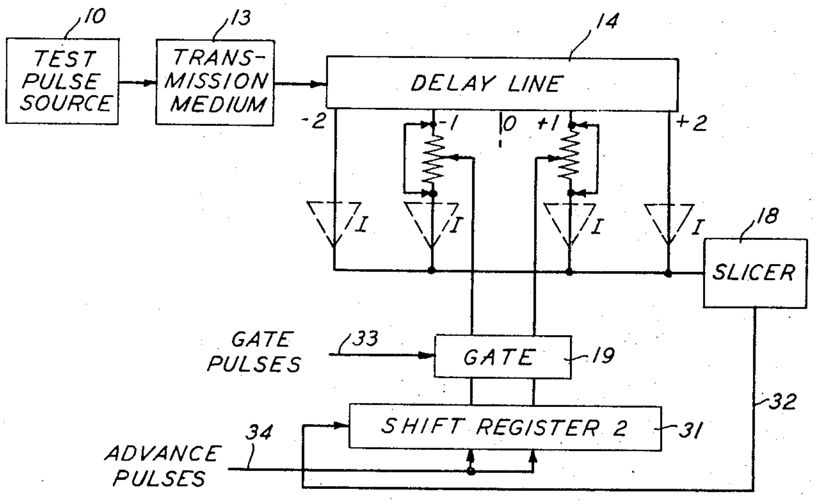
FIG. 3 is a simplified functional block diagram of the automatic equalizer of FIG. 1 in condition for determination of attenuator settings on the other of the alternate test pulses.

The test configuration is now that shown in FIG. 3. In this figure the inverters are shown in phantom to indicate their provisional insertion depending on the polarity of the samples taken of the previous test pulse. As the second test pulse progresses through the delay line the time-spaced successive samples of input sequence $x_n$ are multiplied by the signs (polarity indications) of the output sequence $h_n$ determined on the first test pulse. The products are sliced in slicer 18 and stored consecutively in shift register 31. Because a two-pulse cycle is used, the sliced product stored in the leftmost stage or cell results principally from multiplying the last sample amplitude of the second pulse by the last polarity determination of a sample of the first pulse. Thus, all sliced products are in the proper order to establish final multiplier settings. Inasmuch as outer taps −2 and +2 are in this test configuration, distortion components beyond the normal variable range of delay line 14 are taken into account. The result is that the components of the $h_n$ sequence are not all brought to zero as in the automatic equalizer previously described. Rather they are brought to zero or nonzero values as appropriate with due regard to significant distortion components just beyond the range of the normal variable delay line. The contents of shift register 31 are gated to multipliers $C_{-1}$ and $C_{+1}$, which are accordingly stepped in an off-setting direction with respect to the distortion components measured in the same manner as in the copending application.

Succeeding test pulses are effective to repeat the procedure outlined above. Each pair of test pulses reduces the over-all distortion by an appropriate amount by a steepest descent path. On all odd-numbered pulses the test circuit is in the state shown in FIG. 2 with test inverters out of the circuit. On all even-numbered pulses the test circuit is in the state shown in FIG. 3 with multipliers out of the circuit. Any multiplier that is brought to its optimum adjustment before the others is stepped back and forth in a random walk about its optimum value.

Since information is derived from the odd pulses concerning the direction in which the correction is to be made, the actual amplitude of the components due to the even pulses can be determined by the substitution of a multilevel slicer for the two-level slicer 18 of FIG. 1. At the same time shift register 31 is expanded to more levels, each level storing another binary digit representing the multiple slicer levels. Then the attenuators are stepped by multiples of the minimum increment whereby the final adjustment is accomplished more rapidly. In cases of severe distortion a multiple level slicer may be necessary to insure convergence by providing a more accurate slope measurement.

For optimum performance provision must be made for maintaining the main component $h_0$ of the output constant. For this purpose attenuator $C_0$ can be made controllable in the same manner as the input attenuator in the automatic equalizer of the cited copending application.

Details of this control are omitted for they do not concern the principle of this invention.

Considerations of operation in the presence of noise and settling times are substantially the same as those discussed in the cited copending application of this invention.

There is no limit in principle on how great a degree of distortion can be equalized by the extended-range automatic equalizer of this invention. Practical limitations depend on the size of the incremental steps on the adjustable attenuators, the number of listening-post taps beyond the adjustable range of the equalizer, and the number of slicing levels used in measuring samples of the even-numbered pulses.

While the improved extended-range automatic channel equalizer has been described herein in terms of a specific embodiment, it will be understood that various modifications will be suggested to those skilled in the art within the spirit and scope of the appended claims.

What is claimed is:

1. Apparatus for establishing optimum settings for the multipliers in a transversal equalizer intended for correction of distortion imposed upon pulse communication signals passing from a signal source to a receiver through a transmission medium having an impulse response such that the absolute sum of the amplitude of time-spaced samples of components other than the main component equals or exceeds that of the main component comprising
- means for sending a series of test pulses from said signal source over said transmission medium and into said transversal equalizer,
- means determining the polarity of time-spaced samples of each odd-numbered test pulse traversing said multipliers,
- an inverter connectable in circuit with the several taps on said equalizer,
- means responsive to said polarity-determining means for setting said inverters to oppose the distorting effect of the corresponding sample,
- means detecting the amplitude of time-spaced samples of each even-numbered test pulse multiplied by the settings of said inverters while said multipliers are shunted out of the circuit, and
- means responsive to said detecting means for adjusting the settings of said multipliers accordingly.

2. Apparatus as set forth in claim 1 in which said polarity-determining means is a bistable zero-level threshold circuit.

3. Apparatus as set forth in claim 1 in which said inverter-setting means includes a shift register for storing the polarity indications of individual samples of said test pulses,
- control means controlling the effective insertion or removal of individual inverters in said equalizers, and
- gating means for connecting the stages of said shift register to said control means after each test pulse has traversed said equalizer.

4. Apparatus as set forth in claim 1 and means responsive to test pulses incident on said equalizer alternatively shunting said multipliers and said inverters out of circuit with said equalizers.

5. Apparatus as set forth in claim 1 and further means responsive to test pulses incident on said equalizer for controlling the time of operation of said setting and adjusting means with respect to the incidence of said test pulses on said equalizer.

6. In combination with a delay line having an input end and a nonreflective terminal end and a plurality of uniformly spaced lateral output taps including a main reference tap,
- a transmission medium at the input end of said delay line having an impulse response such that the sum of the amplitudes of uniformly spaced samples thereof on both sides of a main component is equal to or greater than such main component, a test signal source applying a series of impulses of multiple frequency content to said transmission medium, a polarity inverter connected to each of the lateral taps on said delay line and said main tap, a digitally adjustable multiplier connected to each of half of the lateral taps on said delay line closest in toward the main tap, a summing bus common to all said inverters, multipliers, attenuators and said main tap, a slicing circuit connected to said summing bus producing an indication of the polarity of successive samples of each impulse appearing thereon, a first plurality of shift register stages for storing polarity indications derived by said slicing circuit and adapted to control the shunting or not of each of said inverters according to the sense of said polarity indications, a second plurality of shift register stages for storing polarity indications derived by said slicing circuit and adapted to step said multipliers in opposition to the sense of said polarity indications, counting means having at least as many counts as either of said pluralities of shift register stages for advancing the contents of said shift register as each sample is derived, means responsive to the incidence of test impulses on said delay line for shunting said inverters and said attenuators in sequence and for connecting first said first plurality of shift registers and then said second plurality of shift registers to said slicing circuit also in sequence, and means for establishing a sampling rate for said test impulses.

7. Apparatus for establishing optimum settings for the multipliers in a transversal equalizer comprising means transmitting a succession of pulse test signals through a distorting transmission medium and into said transversal equalizer, a main tap and a plurality of equally spaced lateral taps straddling the main tap on said equalizer, a plurality of multipliers one connectable in series with each of half of said lateral taps nearest said main tap, a plurality of inverters one connectable in series with each of said lateral taps, a common summing bus for the outputs of said main tap directly and of said lateral taps through said multipliers or said inverters, means determining the polarity of time-spaced samples of said test signals appearing on said summing bus after traversing said equalizer, means detecting the peak amplitude of each test signal incident on said equalizer, means responsive to said detecting means for shunting out said inverters on all odd-numbered test pulses and said multipliers on all said even-numbered test pulses, a first plurality of memory cells for storing polarity indications from said polarity-determining means for each odd-numbered test pulse, a second plurality of memory cells for storing polarity indications from said polarity-determining means for each even-numbered test pulse, and gating means operable as each test pulse completes its traversal of said equalizer to connect said first plurality of memory cells for control of the insertion or removal of each of said inverters in series with said lateral taps and to connect said second plurality of memory cells for control of the digital adjustment of said multipliers in series with the inner ones of said lateral taps.

8. The apparatus set forth in claim 7 in which said peak detecting means comprises a bistable multivibrator which is alternately set and reset by successive test pulses, and said shunting means comprises an electromagnetic relay operated by the set output of said multivibrator, said relay having a break-contact shunting each of said multipliers and each of said inverters in tandem with a multiplier, said relay also having a break-contact in series with each remaining inverter, and said relay also having a transfer contact between said polarity-determining means and said first and second pluralities of memory cells.

9. The apparatus set forth in claim 7 in which said gating means is controlled by a counter having as many counts as there are taps on said equalizer, and said counter is actuated responsive to said peak-amplitude detecting means.

No references cited.

HERMAN KARL SAALBACH, *Primary Examiner.*

P. L. GENSLER, *Assistant Examiner.*